(12) United States Patent
Qiu et al.

(10) Patent No.: US 12,106,146 B2
(45) Date of Patent: Oct. 1, 2024

(54) QUOTA REQUEST RESOLUTION ON COMPUTING PLATFORM

(71) Applicant: Google LLC, Mountain View, CA (US)

(72) Inventors: Kun Qiu, Fremont, CA (US); Seiji Charles Armstrong, Canberra (AU); Theodore R. Pindred, San Francisco, CA (US); Rui Zhong, San Francisco, CA (US); Maxwell Corbin, Jersey City, NJ (US); Allan Martucci, Miami, FL (US); Aditya Padala, Sunnyvale, CA (US); Dayu Yuan, San Jose, CA (US); Ngoc Thuy Le, Sunnyvale, CA (US)

(73) Assignee: Google LLC, Mountain View, CA (US)

(*) Notice: Subject to any disclaimer, the term of this patent is extended or adjusted under 35 U.S.C. 154(b) by 531 days.

(21) Appl. No.: 17/382,973

(22) Filed: Jul. 22, 2021

(65) Prior Publication Data

US 2022/0129318 A1   Apr. 28, 2022

Related U.S. Application Data

(60) Provisional application No. 63/106,177, filed on Oct. 27, 2020.

(51) Int. Cl.
*G06F 9/50* (2006.01)
*G06N 5/04* (2023.01)
*G06N 20/00* (2019.01)

(52) U.S. Cl.
CPC .............. *G06F 9/50* (2013.01); *G06F 9/5027* (2013.01); *G06N 5/04* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 2019/0391897 A1 | 12/2019 | Vijendra et al. | |
| 2020/0322226 A1 | 10/2020 | Mishra et al. | |
| 2022/0326997 A1* | 10/2022 | Pradhan | G06F 9/5038 |

OTHER PUBLICATIONS

International Preliminary Report on Patentability for International Application No. PCT/US2021/046873 dated May 11, 2023. 8 pages.

(Continued)

*Primary Examiner* — Qing Yuan Wu
(74) *Attorney, Agent, or Firm* — Lerner David LLP

(57) ABSTRACT

The disclosure is directed to systems, methods, and apparatus, including non-transitory computer-readable media, for performing quota resolution on a cloud computing platform. A system can receive user account data from one or more user accounts representing a first user. The system can generate a plurality of features from the user account data characterizing interactions between the first user and the computing platform. From at least the plurality of features, the system can generate a score at least partially representing a predicted likelihood that the additional computing resources allocated to the first user account will be used in violation of one or more predetermined abusive usage parameters during a predetermined future time period.

19 Claims, 5 Drawing Sheets

(56) References Cited

OTHER PUBLICATIONS

Al-Dhuraibi et al. Elasticity in Cloud Computing: State of the Art and Research Challenges. Mar. 1, 2018. IEEE Transactions on Services Computing, vol. 11, No. 2, pp. 430-447, DOI: 10.1109/TSC.2017.2711009 Retrieved from the Internet: <https://ieeexplore.ieee.org/stampPDF/getPDF.jsp?tp=&arnumber=7937885&ref=aHROCHM6Ly9zY2hvbGFylmdvb2dsZS5jb20v>.

Qu et al. Auto-Sealing Web Applications in Clouds. Jul. 13, 2018. ACM Computing Surveys, ACM, New York, NY, US, vol. 51, No. 4, pp. 1-33, DOI: 10.1145/3148149.

International Search Report and Written Opinion for International Application No. PCT/US2021/046873 dated Dec. 13, 2021. 15 pages.

First Examination Report for Indian Patent Application No. 202247061776 dated Nov. 16, 2023. 7 pages.

Ying Wen, J. W. and Tianyao Chen, W. Z. Cat2Vec: Learning Distributed Representation of Multi-Field Categorical Data. Nov. 4, 2016. ICLR 2017, pp. 1-9. Retrieved from the Internet: <https://openreview.net/pdf?id=HyNxRZ9xg>.

Credit Scorecards—Wikipedia,[online] [retrieved Jul. 22, 2021]. Retrieved from the Internet: <URL: https://en.wikipedia.org/wiki/Credit_scorecards>, 2 pages.

Linear discriminant analysis—Wikipedia, [online] [retrieved Jul. 22, 2021]. Retrieved from the Internet: <URL: https://en.wikipedia.org/wiki/Linear_discriminant_analysis>, 13 pages.

Hearing Notice for Indian Patent Application No. 202247061776 dated Jul. 4, 2024. 4 pages.

\* cited by examiner

QUOTA REQUEST RESOLUTION ON COMPUTING PLATFORM

CROSS REFERENCE TO RELATED APPLICATIONS

This application claims the benefit of the filing date of U.S. Provisional Patent Application No. 63/106,177 filed Oct. 27, 2020, the disclosure of which is hereby incorporated herein by reference.

BACKGROUND

A cloud computing platform is a system of computers maintained by a host for providing computing resources and services to one or more users. The platform can allocate different quantities of computing resources to a user, who in turn can use the allocated resources for performing tasks, such as hosting their own services and software applications on the allocated resources.

The platform can provide its own suite of services for assisting the user for their own application or service development, sometimes at monetary cost. The cloud computing platform can provide computing resources that can otherwise be prohibitively expensive for a user to buy and directly maintain. The platform can provide a series of abstractions between hardware of the platform and the platform user. Abstraction to users of the platform can appear in different forms, such as in an infrastructure-as-a-service (IaaS), platform-as-a-service (PaaS), or software-as-a-service (SaaS) paradigm.

To facilitate fair and proportioned distribution of available computing resources, a cloud computing platform can implement a quota resolution system for setting, enforcing, and adjusting a quota for a user of the platform. The quota can represent an upper limit for the amount of computing resources the user can request and use from the platform at a given time.

The quota resolution system can include one or more processes for receiving requests from users who wish to have their quota increased, thereby allowing the users to increase their allocation of computing resources on the platform. One problem that can occur is that a user may request computing resources (as an initial request or a request for additional allocation) and then use the computing resources in a manner that violates agreed-upon conditions for resource use between the users and the platform.

For users with little to no history of interacting with the platform, it can be difficult to automate the quota resolution system to accurately approve or deny requests for quota increases. Further, false positives, i.e., rejecting a quota request for a user that would have otherwise used the additional resources in a compliant and productive manner, are particularly detrimental to the user experience and the efficient utilization of computing resources. By contrast, manual inspection of quota requests by human operators can result in fewer false positives, but for a large platform that might service tens of thousands of users concurrently, a manual approach is infeasible.

In addition, heuristic-based or rule-based approaches, e.g., scorecard methods, for quota request resolution also fall short of accurately resolving quota requests. This is at least because these approaches often rely on a small set of (often) hand-tuned parameters obtained from user account data.

BRIEF SUMMARY

This application relates to a quota resolution system for resolving quota requests for computing resources on a cloud computing platform. According to some aspects of this disclosure, the quota resolution system can accurately predict future behavior of a user whose interactions with the platform are represented by one or more user accounts. The quota resolution system can predict a likelihood that a user, given additional computing resources, will abuse the computing resources by performing activity prohibited on the platform within a future time period. In response, the quota resolution system can resolve quota requests from the user by approval or denial. In some implementations the quota resolution system can allocate additional computing resources that the quota resolution system predicts a user will need but has not requested yet.

The quota resolution system can obtain data from diverse sources of a cloud computing platform, and engineer features that are considered most relevant for determining the likelihood that a platform user will abuse additional computing resources allocated to the platform user. The engineered features can characterize the platform's user interaction with the platform across multiple user accounts. A single platform user may be represented by multiple accounts, because the platform offers many specialized services. The quota resolution system can process different features from different accounts representing activity by the platform user, such as financial transactions, virtual machine usage, and project management of projects hosted on the platform.

The quota resolution system can implement one or more machine learning models that are trained to predict a likelihood of abuse by the platform user of additional computing resources in the future. The system can further offset the likelihood according to one or more other indicators that are found to be relevant to the ultimate prediction of abuse.

The quota resolution system can train and retrain a model that is trained to generate a quota score representing the likelihood that a platform user will abuse additional computing resources. The system can automatically generate new training data from the platform to further train the system in detecting abusive behavior, even as behavioral patterns shift over time. The system can evaluate its own performance according to a variety of different metrics, and retrain itself to more accurately predict abuse by focusing on common characteristics of different subpopulations of a cloud platform user base.

The quota resolution system can use data dispositive of user abuse of the platform in conjunction with many other signals. In other words, the quota resolution system does not merely leverage an existing system within the platform for monitoring and punishing users found to have abused the system.

In general, one innovative aspect of the subject matter describe in this specification provides for a system comprising a computing platform comprising a plurality of processors and one or more storage devices storing instructions that are operable, when executed by the plurality of processors, to cause the plurality of processors to perform operations. The operations include allocating computing resources up to a first quota and to a first user account of one or more user accounts representing a first user of the computing platform, wherein the first quota is an upper limit of computing resources allocated to the first user account. The operations include receiving user account data from the one or more user accounts representing the first user. The operations include generating a plurality of features from the user account data, wherein each feature is a measurable characterization of interactions between the one or more user accounts and the computing platform; and generating, from at least the plurality of features, a score at least partially representing a predicted likelihood that additional computing resources allocated to the first user account will be used in violation of one or more predetermined abusive usage parameters during a predetermined future time period.

Generating the score can include generating a higher score in response to a lower predicted likelihood that the additional computing resources will be used in violation of the predetermined abusive usage parameters; and generating a lower score in response to a higher predicted likelihood that the additional computing resources will be used in violation of the predetermined abusive usage parameters.

The operations can further include determining that the generated score does meet a predetermined threshold representing a minimum score for allocating additional computing resources in excess of a respective quota for a user account; and in response to determining that the generated score meets the predetermined threshold, allocating additional computing resources to the first user account, and updating the first quota.

Generating the score can include generating the score using one or more machine learning models trained to generate the score from the plurality of features. The operations can further include determining, by the system, that the score does not meet a plurality of evaluation criteria; and in response to determining that the score does not meet the plurality of evaluation criteria, retraining the one or more machine learning models trained to generate the score from the plurality of features.

The user account data can be the first user account data received at a first time, and the generated score is a first score. The operations can further include generating tagged user account data and retraining the one or more machine learning models on the tagged user account data. Generating the tagged user account data can include receiving second user account data generated at a second time prior to the first time and separated by a length of time equal to or greater than the length of the predetermined future time period, and tagging the second user account data with a second score generated using the second account data after the expiration of the future time period relative to the second time.

Generating the plurality of features can include generating a graph representing the one or more user accounts; and generating a first feature of the plurality of features from one or more other features of the plurality of features of the one or more user accounts in the graph.

The user account data can include data characterizing computing resource usage by the first user through the one or more user accounts on the computing platform. The operations can include determining that the first user requires additional computing resources. The determining can include processing the data characterizing computing resource usage by the first user through one or more machine learning models trained to receive the data characterizing computing resource usage and to predict a measure of additional computing resources needed in excess of the first quota during the predetermined future time period.

Allocating the additional computing resources to the first user can include predicting a first time by which the first user will require the additional computing usage, and allocating the additional computing resources before the first time.

The operations can further include determining a quantified measurement of additional computing resources to allocate to the first user, in accordance with the data characterizing computing resource usage.

The predicted likelihood can be a predicted abuse likelihood, the operations can include maintaining a resource allocation service for allocating additional computing resources of the computing platform in response to a user request and a payment. Generating the score can include generating a predicted revenue likelihood that the computing platform will receive a first request to allocate additional computing resources and a first payment from one of the one or more user accounts within the predetermined future time period, and generating the score as a function comprising the predicted revenue likelihood and the predicted abuse likelihood.

Generating the score can include generating the score in accordance with $f(x_T, a_T) = act(x_T) + a_T * (act(x_T) - 1)$ where T is the predetermined future time period, $x_T$ is the predicted revenue likelihood, $a_T$ is the predicted abuse likelihood, and $act(\bullet)$ is a nonlinear function with a range between −1 and 1. The nonlinear function can be one of a logistic function, a hyperbolic tangent function, and a rectified linear unit function.

Generating the predicted likelihood can include generating the predicted likelihood in response to a request from the first user account for the additional computing resources.

The operations can further include executing, by the computing platform, a plurality of applications hosted on one or more of the plurality of computers. The one or more user accounts can include one or more of an application account comprising data corresponding to the first user for interacting with one or more of the plurality of applications, and a billing account comprising data corresponding to billing activity between the first user and one or more of the plurality of applications.

The computing resources allocated to the first user can include computing resources configured to execute one or more virtual machines. The one or more user accounts can include a virtual machine entity including data corresponding to virtual machine creation and usage by the first user on the computing platform.

The operations can further include hosting, by the computing platform, one or more software projects hosted on the computing platform. The one or more user accounts can include a project entity including data corresponding to one or more projects authored or co-authored by the first user.

The first quota can represent one or both of an upper limit of computing resources to be allocated to the first user, and an upper limit of the number of concurrent projects hosted on the computing platform and authored or co-authored by the first user.

The operations can include sending an indication that the additional computing resources have been allocated to the first user, to a first user device associated with the first user.

Other implementations of the foregoing aspect can include a computer-implemented method performed on a computing device, an apparatus, and computer programs recorded on one or more computer-readable storage media.

BRIEF DESCRIPTION OF THE DRAWINGS

Like reference numbers in the drawings indicate like elements.

DETAILED DESCRIPTION

Figure 1:
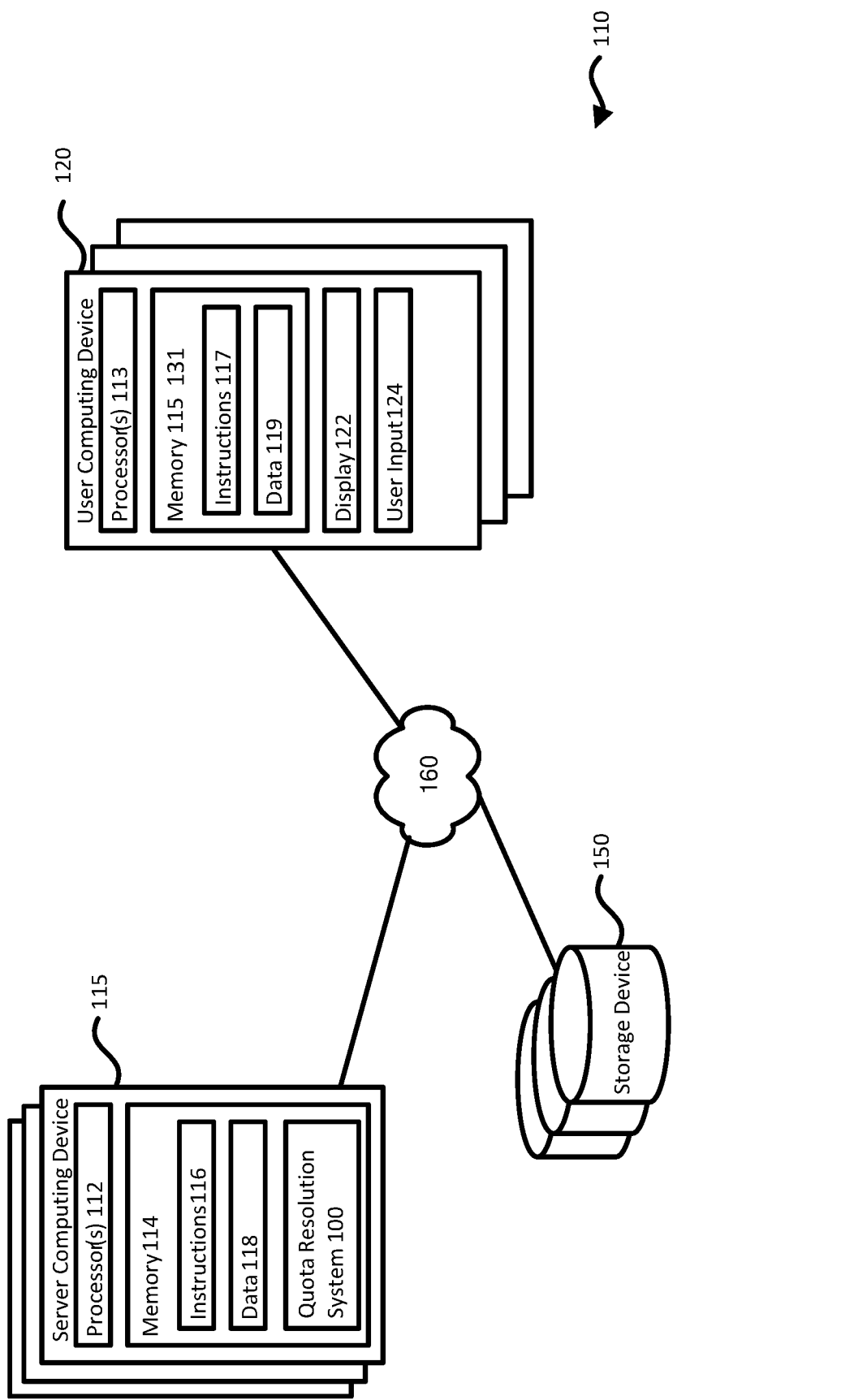
FIG. 1 is a diagram of a quota resolution system implemented on a cloud computing platform.

FIG. 1 is a diagram of a quota resolution system 100 implemented on a cloud computing platform 110. The cloud computing platform 110 can include one or more server computing devices 115, one or more storage devices 150, and one or more user computing devices 120. For ease of description, processes and systems according to some aspects of this disclosure will be described as if implemented on a single server computing device 115 or user computing device 120, but some or all components of the system 100 can be implemented across different computing devices in one or more physical locations.

The server computing device 115 can include one or more processors 112 and memory 114. The memory 114 can include instructions 116 and data 118. The instructions are one or more instructions written in a computer programming language that when executed by the server computing device 115, cause the server computing device 115 to perform one or more actions. The data 118 can include data that is retrieved, processed, or generated by the server computing device 115 as part of one or more actions performed by the server computing device 115 when the instructions 116 are executed. Separately or as part of the instructions 116, the memory 114 can include instructions and data structures that when executed by the server computing device 115 causes the server computing device 115 to implement the quota resolution system 100 according to some aspects of the disclosure.

The user computing device 120 can also include one or more processors 113, memory 131 storing instructions 117 and data 119. The user computing device 120 can additionally include a display 122 and user input 124, e.g., touchscreen or keyboard and mouse. The processors of the devices 115, 120 can be a combination of any kind of processor, e.g., central processing units ("CPUs"), graphics processing units ("GPUs"), or application-specific integrated circuits ("ASICs"). The memory of the devices 115, 120 can also be a combination of any kind, e.g., volatile or non-volatile, including RAM, solid state memory, or hard disk.

The server computing device 115 and the user computing device 120 can communicate according to any communication protocol over a network 160. The network 160 can be a local- or wide-area network, or be the Internet itself. The devices 115, 120 can communicate according to any communication protocol, e.g., SHH, HTTP(S), or FTP. The cloud computing platform 110 can also include one or more storage devices 150 communicatively coupled to the devices 115, 120 over the network 160. The storage device(s) 150 can store data generated by user activity on the platform 110.

The cloud computing platform 110 can perform a variety of functions corresponding to any number of services that can be generally grouped according to different paradigms, e.g., IaaS, SaaS, and PaaS. The platform 110 can host and maintain a variety of different services that perform a task on computing resources, e.g., the server computing device(s) 115 and the storage devices 150.

Computing resources refer to processors, storage devices, and applications running thereon as part of the computing platform 110. Computing resources can also refer to a number and/or quality of network connections over the network 160 to and from the server computing device 115 and the user computing device 120. Computing resources can be quantified in different ways, such as by a number of clock cycles for some selected processors, a period of time for using processors and/or storage devices of the platform, or general unrestricted access to computing resources at a throttled rate of processing/bandwidth.

The platform 110 can host specialized hardware, e.g., ASICs such as tensor processing units ("TPUs"), and can receive data and processing parameters from the user computing device 120 to process the received data on the specialized hardware according to the processing parameters. The platform 110 can host at least part of a storage capacity of the storage devices 150 for a platform user to store data on. Similarly, the platform 110 can establish one or more virtual machines or other forms of abstraction between the user computing device 120 and the server computing device 115 to allow a user of the user computing device 120 to access and use computing resources of the platform 110 through the virtual machines.

The platform 110 can also facilitate one or more services for allowing a user of the user computing device 120 to run and maintain their own services. For example, the platform user of the user computing device 120 may run their own service for one or more secondary users, i.e., users of the platform user's service. Secondary users can include platform users of the platform 110. The service can be hosted on computing resources allocated to the platform user and the secondary users can interact with the service hosted on the cloud computing platform 110.

The platform 110 can also host one or more projects authored or co-authored by platform users. The projects can be software programming projects with source code that can be stored and executed by the platform 110. The user computing device 120 can display an interface by which a platform user can use the user input 124 to write source code that is automatically saved and executed by the platform 110. The platform 110 can offer a number of application programming interfaces ("APIs"), which can define interfaces for the user computing device 120 to communicate with services hosted by the server computing device 115. For example, the platform may host APIs related to training and processing machine learning models using data stored on the platform 110. The platform user can invoke one or more function calls defined in a corresponding API, using source code provided to the platform 110 through the user computing device 120. In turn, when the user source code is executed, the platform 110 can automatically execute services invoked through the one or more function calls, according to different parameter values specified in the calls.

The platform 110 can be maintained by an individual or an organization, e.g., an organization or one or more individuals that are different from platform users of the platform 110. The platform users can also be one or more individuals or organizations of individuals, e.g., software development companies. The platform users can also be software or hardware that interacts with the platform 110 automatically through one or more user accounts. The platform 110 is configured to offer services to platform users for free or at-cost. The platform 110 may offer a wider range of services relative to a monetary cost. Platform users can pay the platform 110 for these services, which can include larger storage capacity, access to increased processing power, or additional features for base services freely available on the platform 110.

Platform users are represented on the platform 110 as one or more user accounts. A user account is a data structure that represents data collected by the platform relating to one or more platform users. The data represented can be or can include a data entity generated by the platform 110 that is implemented in hardware or software and stores information relating to interactions between the platform user and the platform 110. In some implementations, accounts and entities are different in that a user account can additionally maintain profile settings and preferences that can be modified by the platform user, e.g., through a user interface to the platform 110. An entity, by contrast, can be a data structure internal to the platform 110 and representative of one or more platform users, but is not directly modified by the platform user through a user interface.

The platform user interacts with the platform 110 through one or more interfaces, e.g., using the user computing device 120, and the platform 110 updates the user account in response to different actions performed by the platform user. The platform 110 can also track other data related to the platform user, such as metadata representing when and where the platform user last accessed the platform or a related application or service. The server computing device 115 can perform an account creation process in which a platform user inputs information such as an email address and password through the user computing device 120. In response to receiving the requested information, the platform 110 can set up one or more user accounts to represent the platform user.

The platform 110 can establish multiple user accounts that represent the platform user depending on the manner in which the platform user interacts with the platform 110. One reason the platform 110 can establish multiple user accounts is because different users can be represented by the same account.

One example of a type of user account is a platform account. The platform account generally represents a single user and can represent general information, such as the time of account creation, a period of time since the last login to the platform 110 by the platform user, or locations, e.g., network addresses, from which the platform user logged into the platform 110. In some implementations, the platform 110 creates a platform account upon account creation by the platform user, and then later creates and associates other types of accounts with the platform account as the need arises. For example, if the platform user creates a platform account for the first time and then creates a new software project to run on the platform 110, the platform 110 can create a new project account representing the platform user's activities vis-à-vis project management.

The platform account can include a project entity that represents different projects authored or co-authored by platform users represented by the account and hosted on the platform 110. In this way, the platform user can collectively manage projects mapped to a particular project entity with other platform users. The project entity can be a data structure implemented in software or hardware and include data representing different aspects of authored or co-authored projects. In some implementations, the platform user (and potentially other platform users) is additionally represented by a project account that maintains a project entity related to projects authored or co-authored by the platform user and potentially one or more other users. The project account can represent metadata corresponding to different projects, as well as track changes to the projects, e.g., creation, modification, or deletion of projects.

The platform account can include a virtual machine entity that represents information relating to the virtual machines running on the platform 110 of which the platform user has access. A virtual machine entity can be a data structure implemented in software or hardware and represent one or more virtual machines and the platform users that have permission to use or modify the virtual machine. The virtual machine entity can also track usage data relating to the represented virtual machines, e.g., a number of virtual machines, computing resources virtualized, and a usage to idle time ratio. In some implementations, the virtual machine entity is represented at least partially by the project entity, e.g., as a sub-entity.

In some implementations, the platform user (and potentially other platform users) is represented by a virtual machine account that maintains data related to virtual machines of which the platform user has access to. The virtual machine account can represent metadata corresponding to different virtual machines, as well as track changes to the virtual machines, e.g., changes in resource allocation or user settings of the various virtual machines.

Another example of a type of account is a billing account. The billing account generally represents financial transactions and billing activity between the platform user and the platform 110. The billing account can maintain data corresponding to available monetary funds for platform users represented by the billing account on the platform 110. For example, the platform 110 can run a subscription service for a suite of different applications hosted on the platform 110. The platform user can subscribe to one or more of the applications. Billing and financial transactions between the platform user and the platform 110 for the subscribed applications can be represented by a corresponding billing account. As in the project entity or virtual machine entity, above, the billing account may be shared by multiple platform users. In some implementations, the platform 110 maintains billing information as described above for a billing account, but as an entity that represents billing activity for one or more platform users through respective platform accounts.

Another example of a type of user account is an application account. The application account can represent information relating to the platform user's interaction with available services or applications of the platform 110. For example, the platform user can submit requests to process data to existing applications running and hosted by the platform 110. One example of such an application is a machine learning application that receives data from the user computing device 120 as submitted by the platform user, and generates analysis and insights from the data for the platform user to review. The analysis can include ways to improve industrial processes represented by the input data, such as improving supply chain management, securing customer data, or deploying infrastructure for telecommunications. The application account can include data representing the nature or status of these requests, as well as the results from data processed from previous requests. In some implementations, as described above with reference to project and billing entities, data represented by the application account can be stored on the platform 110 as an entity representing application activity for one or more platform users through respective platform accounts.

From the perspective of the platform user, the platform user can login and interact with the platform 110 using a single account, e.g., the platform account. The interface between the server computing device 115 and the user computing device 120 can handle individual account updating as the platform user switches activities during a session with the platform 110. For example, the platform user can perform actions relating to logging in, managing billing activity, and managing projects without having to switch user accounts.

In some implementations, the platform 110 maintains a combination of different user accounts to facilitate organization of the platform 110 and the different services provided. In some implementations, the platform user is represented by a single platform account, and the platform account represents different entities corresponding to services such as applications, billing, projects, and virtual machines. In some implementations, different entities are managed as different accounts or sub-accounts directly or indirectly managed by the platform user through the platform account. The platform 110 may manage different entities in this manner to facilitate organization, as described above, but also as a technique for managing entities representing interactions between the platform 110 and multiple platform users.

In some implementations, the platform 110 can manage user authentication as a service requiring user credentials corresponding to the platform account of a platform user. After successful authentication, the platform 110 can switch between accounts automatically and in response to user activity without additional authentication. In some implementations, however, the platform 110 may require additional authentication to perform certain actions in response to user input, e.g., when the platform user requests to use funds available to a representative billing account.

Because many, e.g., thousands or tens of thousands, of platform users can request and use computing resources of the platform 110 concurrently, the platform 110 maintains a quota that is associated with the one or more user accounts that represent a platform user on the platform 110. The quota represents an upper limit to the amount of computing resources or services that are available to the platform user. The platform 110 may enforce a quota on the different platform users to maintain platform accessibility and to prevent resource hogging by a relatively small proportion of the user base.

The quota can represent an upper limit in a variety of ways. For example, the quota can be a rate quota, representing the number of API requests a platform user can make to the platform 110 in a given day, or a total amount of data that can be requested through API calls. In addition or alternatively, the quota can be an allocation quota that limits the number of virtual machines or load balancers that services or projects authored or co-authored by the platform user can use concurrently or within a period of time. In addition or alternatively, the quota can be a storage quota that limits the amount of data storage the platform user can access. The quota can also be an upper limit of the number of a particular type or types of hardware that can be allocated to the platform user account, e.g., a total number of CPUs or GPUs.

Upon account creation, the platform 110 can set a quota for a platform user to a predetermined value, e.g., 1 terabyte storage quota, 100 API requests per day, etc. Although the quota represents an upper limit, the platform user may not use or have computing resources allocated that meet the quota. For example, the platform user may have a storage quota of 1 terabyte of data storage, but only have allocated 500 gigabytes of storage.

As the computational needs of the platform user increase over time, the platform user may wish to request additional allocation of computing resources. In general, the platform user can request from the platform 110, e.g., through a platform account and an interface displayed on the user computing device 120, additional allocation up to their quota. In the previous example, the platform user whose allocation of data storage is 500 gigabytes can request that their allocation be increased to their quota of 1 terabyte. In some implementations, the platform 110 automatically matches the platform user's computing resource allocation with their quota.

The platform 110 can receive a request for additional computing resources that exceeds a quota set for the requesting platform user, e.g., through a request sent by the platform account for the platform user. As described in more detail below with reference to FIG. 2, the quota resolution system 100 is configured to receive the request and user account data for the one or more user accounts representing the platform user on the platform 110, and to automatically resolve the request. Resolving a quota request means processing the quota request from a platform user account or on behalf of a platform user, and rendering a decision as to whether or not to approve the request.

If the request is approved, the platform 110 can allocate additional computing resources to the platform user in accordance with the request and can increase the quota. If the system 100 denies the request, the platform 110 is configured to send an indication to the platform user, e.g., by displaying a notice that the request is rejected on the display 122 of the user computing device 120.

As described below with reference to FIG. 2, the quota resolution system 100 is configured to resolve requests by predicting a likelihood that a platform user, given additional computing resources, will abuse the additional computing resources. Abuse in this specification refers to the platform user violating one or more abusive usage parameters of the cloud computing platform 110. Abusive usage parameters represent prohibited and restricted ways to use the computing platform 110 by the platform user. The abusive usage parameters are predetermined and can vary from implementation-to-implementation. The abusive usage parameters can define restricted or illegal activity which platform users are prohibited from performing using allocated computing resources. The platform user is said to be in violation of the abusive usage parameters when performing prohibited or restricted activity as defined by the abusive usage parameters.

For example, the abusive usage parameters can specify that the platform user cannot use allocated computing resources for hosting copyrighted material. Other examples of platform abuse include using the platform to conduct or facilitate illegal activity, like hosting a service for doxxing, performing denial-of-service attacks, or infecting computers with malware. The abusive usage parameters can also specify prohibited activities that may not be per se illegal but have been prohibited from operation on the platform 110 for one reason or another, e.g., data scraping or cryptocurrency mining.

The abusive usage parameters can also restrict the use of the platform 110 for mass botting or other forms of automation that disrupts other services or websites, for example by mass purchasing sought-after products on release to sell back at a drastically inflated price. The abusive usage parameters can also include parameters for specifying productive use of allocated computing resources, e.g., not allowing virtual machines allocated to the platform user to remain idle for more than a predetermined period of time. In some implementations, the platform user can receive the abusive usage parameters through a terms and conditions agreement sent to the platform user by the platform 110 during account creation.

Figure 2:
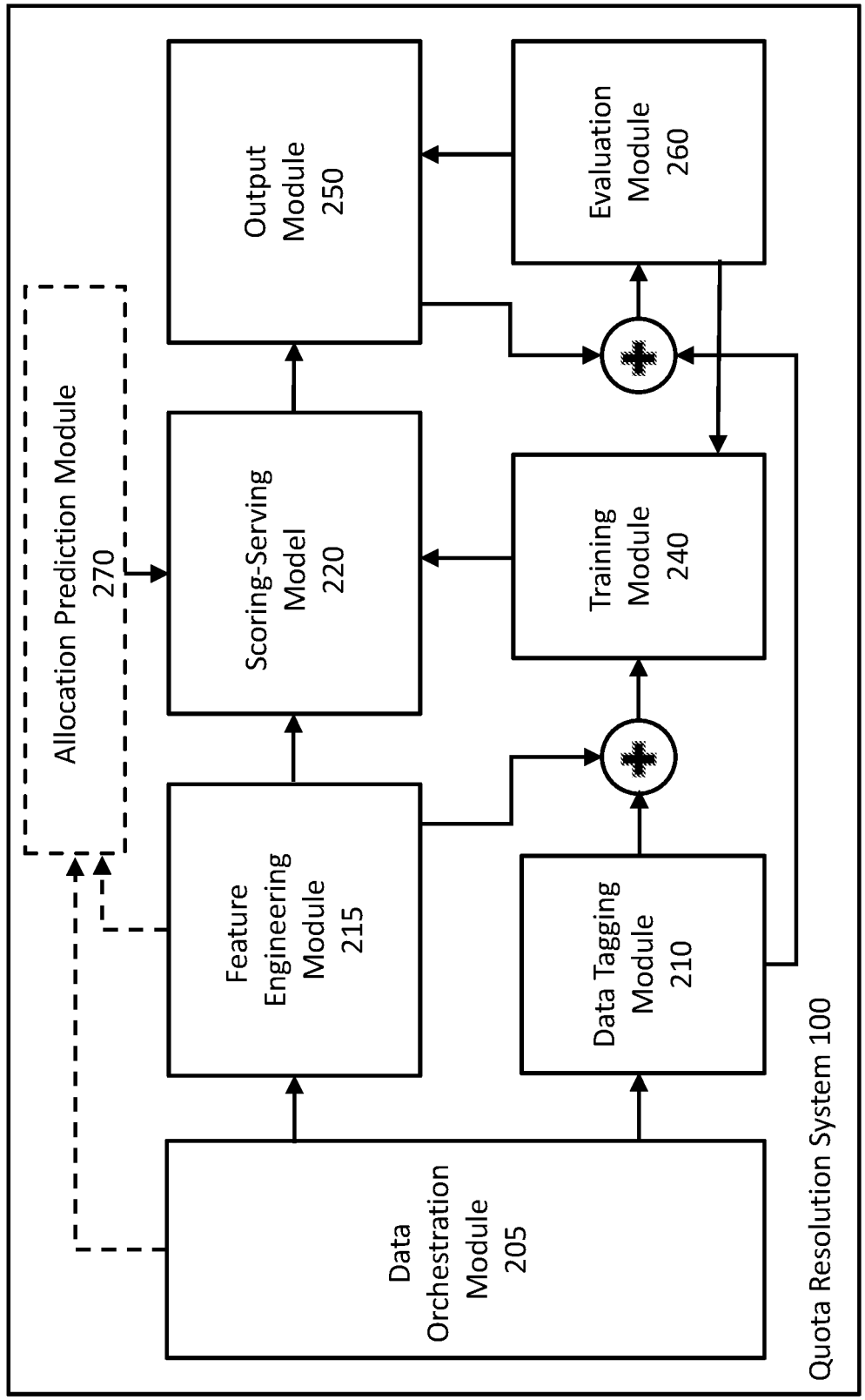
FIG. 2 is a diagram showing an example implementation of the quota resolution system.

FIG. 2 is a diagram showing an example implementation of the quota resolution system 100. The quota resolution system 100 can include a data orchestration module 205, a data tagging module 210, a feature engineering module 215, a scoring-serving model 220, a training module 240, an output module 250 and an evaluation module 260. In some implementations the quota resolution system 100 also includes an allocation prediction module 270.

In general, the quota resolution system 100 is configured to receive a quota request and raw input data from the platform 110 and to generate a set of engineered features with values obtained from the raw input data. The system 100 processes the engineered features through the scoring-serving model 220. The scoring-serving model 220 generates a quota score representing the likelihood that the platform user requesting additional computing resources will abuse those resources according to one or more abusive usage parameters. The scoring-serving model 220 passes the quota score to the output module 250, which is configured to process the quota score and resolve the quota request according to the quota score and optionally one or more other criteria.

The quota resolution system 100 can also include the training module 240 for training or retraining the scoring-serving model 220 with updated training data from the platform 110. The quota resolution system 100 can also include an evaluation module 260 that is configured to evaluate performance of the scoring-serving model 220 against a plurality of evaluation criteria, and to trigger retraining by the training module 240 in response to the performance not meeting the plurality of evaluation criteria.

The following description includes a description of an example flow of data as it is received by the data orchestration module 205, processed by one or more other components of the quota resolution system 100, and used to generate an output by the output module 250 to resolve a quota request. The various components can be implemented on one or more server computing devices in one or more physical locations. The flow of data from input to output in some implementations can vary from the flow described in accordance with aspects of this disclosure. In some implementations, some components are omitted, while others not shown in FIG. 2 are added.

The data orchestration module 205 is configured to obtain and process raw data to be processed by the quota resolution system 100. The data orchestration module 205 obtains user account data, and in some implementations, computing resource data, and preprocesses the data into a standardized format for consumption by the feature engineering module 215 and the data tagging module 210. Because the platform 110 can be complex and store user account data across a plurality of different sources, the data orchestration module 205 can be adapted to handle different types of data. Instead of updating every module implemented on the system 100 when raw data on the platform 100 changes, the data orchestration module 205 can be updated instead, e.g., by one or more other modules of the platform 110.

The feature engineering module 215 is configured to generate features from the user account data obtained from the data orchestration module 205. In this specification, a feature is a measurable characteristic of some part of user activity on the platform 110. The feature engineering module 215 is configured to generate both simple and compound features from data obtained by the data orchestration module 205. The output for the feature engineering module 215 can be a numeric multi-dimensional array of numeric and/or categorical values.

Simple features are features that are mapped directly from data measuring some aspect of user activity by the platform user and through the one or more user accounts on the platform 110. A simple feature can be an account age for a platform account representing the platform user. The feature engineering module 215 is configured to set the value of the signal, e.g., six months old for a created account, and map that value to the feature for account age of the platform account. The feature engineering module 215 can query one or more tables of data obtained from the data orchestration module 205 according to table fields corresponding to values for different features. For example, the obtained data may include a field for platform_account_age and the feature engineering module 215 is configured to query the value at that field and map it to the simple feature for platform account age.

The feature engineering module 215 is also configured to process at least a portion of the obtained data to generate compound features. Compound features are the product of processing one or more other features or obtained data from the data orchestration module 205. For example, if obtained data includes a table with fields for daily RAM usage for virtual machines allocated to the platform user, the feature engineering module 215 can generate values for a compound feature that represents daily RAM usage. One compound feature can be the average RAM usage over thirty days. Another compound feature can be a ratio between RAM usage from the previous thirty days and RAM usage for periods of time earlier than the previous thirty days.

The feature engineering module 215 can generate compound features and use the compound features to further characterize user activity in a way that simple features alone cannot. The variety in feature representation allows the quota resolution system 100 access to different insights into user activity that can have strong or weak correlations to the final determination of whether or not the platform is likely to abuse additional allocated computing resources. Further, the feature engineering module 215 generates features from a platform that the platform user interacts with in a variety of ways through a variety of different user accounts. The interrelationship between different platform users through various types of billing, application, project, and virtual machine accounts or entities makes the task of identifying features corresponding to a particular platform user's behavior non-trivial. This is at least because over-reliance on certain features can skew the determination of the system 100 as to whether the particular platform user will abuse allocated computing resources.

Features can be categorized according to the type of account from the feature engineering module 215 generates values from, e.g., platform account level features, billing account level features, etc. Within each account level there are one or more sub-categories, e.g., a history of reported abuse by a platform user can be under an "abuse" sub-category within different account level features. Examples of different features that the feature engineering module 215 can generate follow.

Platform account level features are generally features related to how the platform user accesses the platform 110, and how the platform 110 identifies and authenticates the platform user. Examples of platform account level features can include: an age of the platform account and characteristics of an email address corresponding to the platform account. Characteristics for the email address can include the presence or percentage of letters to numbers or certain patterns of strings within the email (such as the presence of the current year, or strings of letters concentrated in certain parts of a QWERTY keyboard). Other examples include the type of domain of the email address, e.g., .com, .org, .edu, and whether the domain is free or requires payment to use.

Platform level account features can also include features characterizing information about a platform account of a platform user. If platform level account features of this type are used, the feature engineering module 215 can be configured to process an encrypted version of the characterizing information, and engineer features from that encrypted version.

Platform account level features can also include features characterizing the location of the platform user in accessing the platform. Location of the platform user can include the country or region with which the user computing device 120 is associated. Location of the platform user can be identified based on selections made by the user while accessing the platform 110, utilizing the user computing device's 120 network address, and other known methods. Location of the user computing device 120 can be included as a platform account level feature when appropriate permissions are present with the user computing device 120. In some implementations, the feature engineering module 215 can generate features characterizing the location of the platform user in accessing the platform, according to an encrypted version of the location data. For example, the feature engineering module 215 can generate location features without specific knowledge of the country or region, and the scoring-serving model 220 can instead rely on differences and similarities as between location features between platform accounts to predict whether particular platform users sharing certain location feature values are likely to abuse the platform. Further, the platform 110 can include features related to the identified location, such as whether the location has been predetermined to be a source of abuse by the platform 110.

Platform account level features can also include a similarity between the platform account and another platform account that have had quota requests rejected. For example, a feature can represent the distance between the platform account email address with an email address of a known abuser.

Another type of platform account level feature relates to cross-product usage by the platform user of different services or applications hosted by the platform 110. Features of this type can include usage data corresponding to usage by the platform user of different products, as well as data representing how often certain groups of applications or services are used together by the platform user.

Another type of platform account level features relates to the terms and conditions explicitly or implicitly agreed-to by a platform user at platform account creation. The terms and conditions can describe some or all abusive usage parameters specifying abusive activity on the platform. If the platform 110 is accessible by platform users of different countries or states, then the terms and conditions may vary, for example in accordance with local law and regulation. Therefore, platform account level features can include features corresponding to the language of the terms and conditions as requested or agreed-to by the platform user, and the physical region/location corresponding to the version of the terms and conditions requested or agreed-to by the platform user.

Another type of platform account level features relates to dormancy of the platform account, i.e., data relating to the number of logins through the platform account, time between logins, and time since last login. Features of this class can also include time between different activities by the platform account, e.g., time between last the request for additional computing resources.

Another type of platform account level feature relates to the nature of current or previous requests by the platform user to increase computing resource allocation. Example features include the type of quota request, e.g., for additional CPU/GPU/ASIC resources or additional projects, a ratio between successful and rejected requests, a quantity of quota requests and how much additional computing resources were requested in each quota request, and whether the quota increase relates to use of a paid service on the platform 110.

Another type of platform account level feature relates to console behavior by the platform user in interacting with the platform 110. For example, this type of feature can include data collected by the platform 110 relating to inputs, and time spent by the platform user on an interface between the server computing device 115 and the user computing device 120 as the platform user interacts with the platform 110.

The platform user can also be represented by one or more project entities that can be managed by one or more platform user accounts. As described above with reference to FIG. 1, the project entities in some implementations are managed by project accounts. A project account can represent one or more platform users. Project entity level features include metadata for projects hosted on the cloud platform, such as creation date, type of project, or the programming language the project is written in, if applicable. Project entity level features can also include API usage, for example tracking which APIs are used by which projects, and how often calls are made.

One type of project entity level features relates to reported project abuse. Project abuse type features can include the ratio of abusive projects, i.e., in violation of the abusive usage parameters, versus all projects within the last thirty days, and the percentage of abusive projects among all projects represented by the project entity. The ratio or number of abusive projects can be offset according to a predetermined false positive rate. The abusive projects can be reported and validated by hand, or automatically detected by the platform 110.

The platform user can also be represented by one or more billing accounts. Billing accounts representing the platform user can include data corresponding to a number of different features characterizing billing behavior by the platform user on the platform 110. Examples include the number of billing accounts representing the platform user, the age of each billing account, reported fraudulent activity in relation to paying bills owed for subscribed-to services, a rolling balance for each billing account, and the payment (or non-payment history) of the platform user. Similar to a platform account, billing accounts representing the platform user can also represent when a billing account was created, and how often the platform user is active on the platform 110 in performing billing-related activities.

Billing account level features can also include ratios or relative contributions of activity on a billing account by a platform user. A billing account can be shared by a plurality of platform accounts that individually interact with the platform 110 through the billing account. For example, billing account features can represent how much of the subscription/purchasing is performed by the platform user versus another user, or a ratio between projects that use subscription services paid for through the billing account that are authored by the platform user versus projects that also use paid-for services but are not authored by the platform user.

The platform user can also be represented by one or more virtual machine accounts. The virtual machine accounts include data representing virtual machines managed by the platform user and hosted on the platform 110. Virtual machine account level features generally include features relating to the usage of any virtual machines associated with the one or more virtual machine accounts. For example, these features can include resource allocation and usage, request history, activity performed using the virtual machine, network traffic, and statistics for uptime/downtime of the virtual machines.

Reputation is a general type of feature that can be available across user accounts representing the platform user. In some implementations, the platform 110 is configured to maintain a reputation metric that measures a platform user's interaction with different applications and services provided by the platform 110. The platform 110 can generate these reputation metrics separately from the quota resolution system 100, and may use those metrics for a variety of purposes, e.g., for comparing platform users according to the metrics, or for reporting out of the platform 110. For example, one reputation metric for a billing account of the platform user can measure timeliness in making payments to the platform 110. The feature engineering module 215 is configured to use reputation metrics as additional features for generating the engineered set of features, either alone or in combination with other features.

Risk features are another type of feature that can be available across each user account representing the platform user. Values for risk features measure risk of abuse of a platform user fitting a certain profile of features. For example, the feature engineering module 215 can generate risk features for abuse among accounts created during a certain time period. The feature engineering module 215 can generate the risk features and perform discriminant analysis to discriminate between platform users fitting a given profile of features who are likely to abuse the computing platform 110, from platform users fitting the given profile but who are not likely to abuse the platform 110. The quota resolution system 100 can implement any one of a variety of discriminant analysis techniques over a given profile of platform users.

Risk features are different from the quota score generated by the scoring-serving model 220, at least because the model 220 can use values for the risk features as part of generating the quota score. Another reason risk features are different is because the quota score is an overall prediction of the likelihood of abuse by a platform user, while the risk features represent only platform users within a profile. Despite this difference, the risk features can be helpful in improving accuracy of the quota resolution system 100 in resolving quota requests because the features can represent the potential risk of abuse from subpopulations of a user base for the platform 110 with additional nuance.

Appeal metrics are another type of feature that can be available across each user account representing the platform user. Appeal metrics measure appeals by the platform user to the platform 110. For example, the platform 110 can provide a service in which the platform user can appeal a decision by the platform 110 to remove a project. The platform 110 may automatically remove projects authored by the platform user if the platform 110 detects that the project is violating abusive usage parameters of the platform 110. In response, the platform 110 may receive an appeal from the platform user, giving reasons why the removal was not correct. The platform 110 may automatically review the appeal or pass the appeal to the entity hosting the platform 110 for further review. As examples, appeal metrics can measure the frequency and type of appeal provided to the platform 110 by the platform user.

Figure 3:
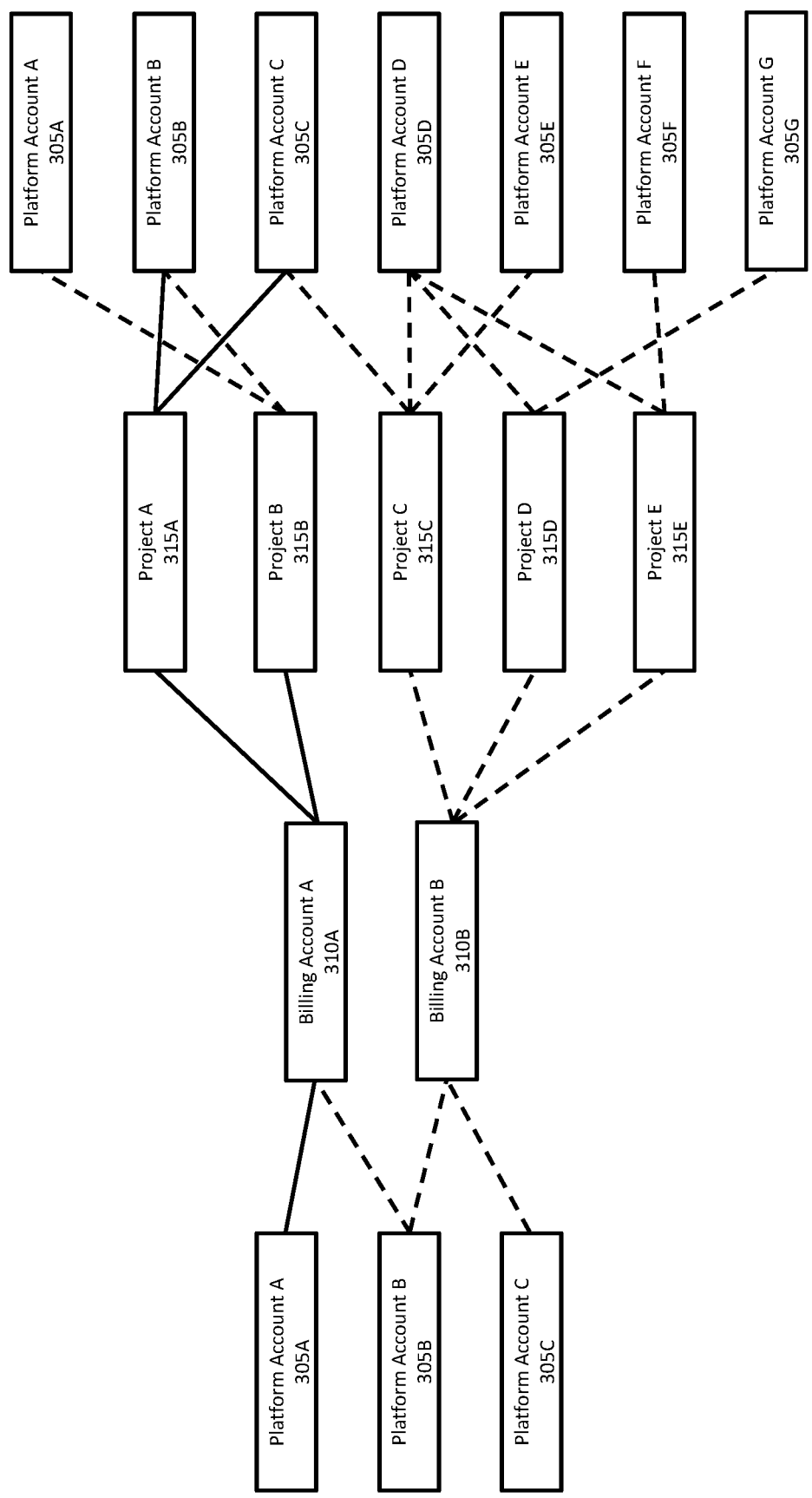
FIG. 3 is a diagram of an example mapping of user accounts representing different platform users.

Because a platform user can be represented by different user accounts, the feature engineering module 215 can aggregate any of the above-described features to represent an aggregated feature across all user accounts representing the platform user. The feature engineering module 215 can receive as input a mapping of identifiers representing each user account of the platform user and how each account relates to one another. For example, if the platform user is represented by several billing accounts, then the feature engineering module 215 can aggregate payment history across each account, creating an aggregated payment history feature. The value for the feature in this case can be an average payment history across billing accounts for the platform user, as an example. FIG. 3, below, shows an example of the mapping.

FIG. 3 is a diagram of an example mapping 300 of user accounts representing different platform users. The mapping 300 shows a relationship between platform accounts 305A-F, billing accounts 310A-B, and projects 315A-E hosted on the platform 110. Connections between the accounts and projects as shown in FIG. 3 indicates relationships on the platform 110, e.g., an is represented by relationship in the case of platform accounts and billing accounts, and an authored/co-authored by relationship in the case of platform accounts and projects. For ease of description, reference is made to the various relationships for platform account A 305A (denoted by solid lines), while other relationships among the other platform accounts 305B-G are denoted by dashed lines. Also in this example, The platform accounts 305A-F as connected with the various projects 315A-E. In some implementations and as described above with reference to FIG. 1, a platform account for a platform user can directly represent data for a project entity As shown in FIG. 3, the platform account A 305A is represented by the billing account A 310A. The billing account A 310A represents data for billing activity for projects A 315A and B 315B. The projects 315A, 315B are co-authored by the platform account B 305B and the platform account C 305C. This example highlights the variety of different relationships between projects and user accounts on the platform 110. Platform accounts A-C 305A-C are related to the projects A, B 315A-B, but in different ways. For many thousands of accounts and services available on the platform 110, the connections between user accounts and projects can be large and separated by many degrees between individual accounts.

Also in FIG. 3, the platform account A 305A is directly linked to the project E 315E without an intervening billing account. This example further shows how a platform account can be both directly or indirectly to any other type of user account or entity of the computing platform. For example, a platform account can be an author of a project, without being associated with a billing account for that project.

The feature engineering module 215 can leverage the rich interconnections between user accounts to generate additional features for the scoring-serving model 220 to process. For example, one type of feature can relate to graphs or subgraphs created by relationships between user accounts and projects on the platform 110. The feature engineering module 215 can generate connected components between different accounts, which can represent each account or project connecting the different accounts. The connected component can include some or all data corresponding to individual or aggregated features of the different accounts represented by the connected component. The feature engineering module 215 can filter generated subgraphs according to different criteria to generate other, more specialized features. One example of such a feature is a connected graph of user accounts representing the platform users that are active within a given period of time.

The feature engineering module 215 is configured to perform any of a variety of different graph processing techniques to generate different graph properties corresponding to graphs or subgraphs between user accounts and entities. The graph properties can directly or indirectly form values for features engineered by the feature engineering module 215. For example, the feature engineering module 215 can compute a degree of separation from different platform user accounts sharing different characteristics.

In some implementations, the platform 110 may not have a clear mapping between user accounts representing the platform user. The platform 110 is configured to cluster similar accounts according to a similarity metric, and to generate a cluster score representing the similarity according to the metric. The feature engineering module 215 can use these generated cluster scores to determine which user accounts to aggregate, as described above.

The feature engineering module 215 is configured to perform a variety of statistical operations on aggregated data for user accounts representing a platform user. For example, the feature engineering module 215 can calculate an average, find a distribution, or perform more specialized analysis such as calculating the kurtosis "or tailedness" of a distribution. The results of these statistical processes can form values for more complex features that make up part of the engineered set of features.

The feature engineering module 215 can aggregate data from different platform accounts according to a similarity or likelihood that platform accounts are operated by platform users from the same larger organization, e.g., company or research institute. The feature engineering module 215 can identify whether platform accounts are associated with a particular domain or physical region. This type of data may be relevant to quota resolution, for example because the scoring-serving model 220 may learn a correlation or inverse correlation between a size of an origin organization and the likelihood that a platform user from that organization will abuse computing resources.

In some implementations, the feature engineering module 215 uses data across a plurality of time-steps corresponding to the platform user to determine statistical trends. For example, the feature engineering module 215 can generate a value for a feature representing a trend of the platform user's resource consumption over a period of time. This and other features can then be processed by the scoring-serving model to predict future behavior, i.e., the likelihood of abuse by the platform user given additional resources. In some implementations, the feature engineering module 215 uses data across a plurality of different platform users to generate trends or baselines from which to compare with feature data.

The feature engineering module 215 can include one or more machine learning models trained to receive data from the data orchestration module 205 and to generate values for one or more features from the received data. In this way, the feature engineering module 215 can further extract potential candidates for the engineered set of features, leveraging the data-rich nature of the platform 110.

One example of a learned feature can be API usage. As described above, the feature engineering module 215 can generate features corresponding to the API usage of projects associated with the platform user. API usage can be highly-dimensional, meaning that there can be many data fields from which features can be generated. However, in some cases the feature engineering module 215 may generate a representative feature from the API usage data that is still relevant to model performance, but is less computational intensive. The feature engineering module 215 can implement a machine learning model, e.g., a neural network, which is trained to receive the API usage data and to generate a relatively low-dimensional data structure representative of the API usage data. The feature engineering module 215 can include one or more other machine learning models that are configured to reduce other forms of high-dimensional data.

As part of generating low-dimensional data structures from data of relatively higher dimensionality, the feature engineering module 215 can process, e.g., using the one or more machine learning models, obtained categorical data represented as text or non-numerically. The feature engineering module 215 can then use any of a variety of different techniques for processing the categorical data into a numerical equivalent. In this way, the quota resolution system 100 can process quota requests more rapidly, at least because the feature engineering module 215 is configured to automatically convert categorical data into numerical data.

Returning to FIG. 2, the feature engineering module 215 is configured to generate a set of simple and compound features to be subsequently processed by the quota resolution system 100. Because strategies or behavioral patterns relating to resource abuse can change over time. Therefore, the feature engineering module 215 is configured to periodically reevaluate engineered features according to different metrics. In some implementations, the feature engineering module 215 generates a candidate pool of features and ranks the features by importance.

The importance of a feature can be relative to the objective of a model that processes the feature. For the quota resolution system 100, the scoring-serving model 220 is configured to receive the engineered features and to generate a score at least partially representing a predicted abuse likelihood that additional computing resources allocated to the first user will be used in violation of platform abusive usage parameters. The importance can be measured in a variety of ways, e.g., as a statistical correlation. The feature engineering module 215 is configured to perform feature importance analysis according to a variety of techniques, e.g., using a Random Forest approach, a neural network, or regression analysis techniques such as LASSO.

The feature engineering module 215 can generate a top subset of important features as the features to pass on for training or inference by the quota resolution system 100. In some implementations, the feature engineering module 215 processes the candidate pool of features by permuting the candidate pool to determine an effective size or order of features. The feature engineering module 215 can generate the set of features according to other objectives, in addition to the model objective of the scoring-serving model 220. For example, the feature engineering module 215 can also factor the size of the engineered feature set, e.g., preferring more simple or fewer features when possible and while not substantially sacrificing model performance In addition or alternatively, the feature engineering module 215 can factor the resulting complexity of the scoring-serving model 220 necessary to process the engineered set of features, e.g., by preferring less computationally complex features to process. The feature engineering module 215 can also generate the engineered feature list at least partially based on received hand-tuned parameters that manually assign relative importance to different features.

However the feature engineering module 215 is configured to perform importance analysis in generating the engineered set of features, the feature engineering module 215 is configured to perform importance analysis periodically or in response to trigger events as user activity (both abusive and non-abusive) shifts on the platform 110. For example, the feature engineering module 215 is configured to re-run importance analysis once a month, to allow for changes in the engineered feature set. Because platform users are often implementing their own industrial/business solutions to problems using computing resources on the platform 110, the sort of data obtained by the data orchestration module 205 can vary greatly in response to emerging business practices. Abusive activities can also lead to paradigm-shifting processing on the platform 110. For example, the rise of cryptocurrency mining resulted in a substantial increase of CPU, GPU and/or ASIC usage in response to the requirements for mining different currencies. As such, a periodic reevaluation of the engineered feature set can account for potentially unpredictable business or technical trends.

The feature engineering module 215 can also re-evaluate the engineered set of features in response to events recorded by the platform 110. The events can be anything representing a deviation from normal activity of the platform 110, within a margin of error. The feature engineering module 215 can be configured to listen to a separate module of the platform 110 configured to record and track activity on the platform 110 according to different metrics. For example, increased GPU usage beyond normal demand can prompt the feature engineering module 215 to re-evaluate the engineered set of features. Returning to the cryptocurrency example, the increased GPU usage can be an indicator of cryptocurrency mining, which may or may not be an allowed activity on the platform 110. By triggering the feature engineering module 215 for re-evaluation, the quota resolution system 100 can more quickly adapt to changes in ways platform users can potentially abuse the platform 110.

The feature engineering module 215 can be configured to impute missing values when necessary. In some cases, data from the data orchestration module 205 might not include data for a particular feature of the engineered set of features. In those cases, the feature engineering module 215 can add predetermined values for some or all of the missing features. In some implementations, the feature engineering module 215 can generate a substitute value for a missing feature as a function of one or more other features whose values are known.

The quota resolution system 100 includes the scoring-serving model 220 is configured to receive, as input, the engineered set of features, and to generate, as output, a quota score. The quota score is a numerical representation of the predicted likelihood generated by the quota resolution system that additional computing resources allocated to a user will be used in accordance with abusive usage parameters, i.e., will not abuse additional computing resources, for a given future time period. The scoring-serving model 220 can generate the quota score in response to a request and/or automatically, e.g., on an hourly, daily, or weekly schedule for each platform user.

The range of the quota score can be, for example, integers in the range [0, 1000] where quota scores towards one end of the range correspond to a lower likelihood of abuse, and quota scores on the other end of the range correspond to a higher likelihood of abuse. In some implementations, the scoring-serving model 220 generates and performs further processing on the quota score for a platform user according as a probability distribution in the range [0,1], where 0 corresponds to a predicted 0% chance for a platform user to abuse additional computing resources, and 1 corresponds to a predicted 100% chance for a platform user to abuse additional computing resources. The scoring-serving model 220 can generate predicted likelihoods of abuse anywhere within the range.

The scoring-serving model 220 can generate the likelihood directly as a quota score, or the quota resolution system can map the quota score from a probability distribution, e.g., [0,1] or [−1,1]. The output module 250, as described below, can map the probability distribution over a large range of bins, e.g., 1001 bins for a quota score in the range [0, 1000], which can provide for more granularity in comparing likelihoods of abuse as between similar or dissimilar platform users.

The future time period is a window in time for which the scoring-serving model 220 focuses on a prediction of potential abuse by the platform user. The future time period can be predetermined, e.g., 30 or 60 days from the time at which the quota resolution system 100 generates the quota score.

The quota score as generated by the scoring-serving model 220 is at least a function of one or more learned model parameter values, including an abuse indicator $a_T$. The abuse indicator is a computed parameter of the scoring-serving model 220 representing the predicted likelihood that the platform user will abuse additional computing resources within a future time-period T. In some implementations, the quota score is a function solely of the abuse indicator. In other implementations, the quota score can be represented as a target objective function that includes the abuse indicator and additional parameters.

One example of the objective function can be:

$$f(x_T, a_T, k) = act(k^* x_T) + a_T^* (act(k^* x_T) - 1)$$

where $x_T$ is a learned revenue indicator within the future time period T, $a_T$ is the learned abuse indicator, k is a tuning parameter, and act(•) is a nonlinear activation function. Example functions for act(•) can include tan h, sigmoid, and ReLU. Each parameter is described in turn.

The scoring-serving model 220 is trained to process the engineered set of features from the feature engineering module 215 to generate the abuse indicator $a_T$. For example, if the scoring-serving model 220 is a deep neural network having a plurality of layers, then an input layer of the model 220 can receive the features. One or more hidden layers between the input layer and an output layer can process the features to generate intermediate outputs. Each hidden layer can include one or more activation functions for processing the features or intermediate output from another hidden layer in accordance with a set of weights for the layer. The scoring-serving model 220 learns weight values for the weights of each hidden layer through training, which can be performed by the training module 240, described below.

After processing through the one or more hidden layers, the scoring-serving model 220 can process an intermediate output generated by the last hidden layer through an output layer. The output layer can be configured to generate the abuse indicator and other indicators based on the value of the intermediate output from the final hidden layer. The output layer can process the abuse indicator $a_T$ and any other processed indicators according to a model target function, e.g., the target function above.

The predicted revenue indicator $x_T$ represents a predicted probability that the platform 110 will generate revenue from the platform user meeting a target threshold within the future time-period. The scoring-serving model 220 can predict the value for the learned revenue indicator $x_T$ and $a_T$ using the set of engineered features. The tuning parameter k can be predetermined or learned and introduces a variable for adjusting the relative contribution of the revenue indicator $x_T$ to the quota score.

In some implementations, the tuning parameter k for $x_T$ is selected based on the break-even point of the predicted costs/goals of a potential abuser. For example, in the case of cryptocurrency mining, the overall offset of the predicted revenue indicator $x_T$ can be less important for predicting abuse, if the platform user's abuse is likely to generate more in revenue than a predicted contribution to the platform 110. The quota resolution system 100 can receive, e.g., from the platform 110 or another source outside of the platform 110, an expected or predicted revenue of a platform user in using cryptocurrency mining. In this example, the expected or predicted revenue can be a function of at least current market trends for different cryptocurrencies. Therefore, the scoring-serving model 220 can set the tuning parameter k to reduce the overall contribution of the revenue indicator $x_T$ to the model target quota score.

Although the predicted revenue indicator $x_T$ is one predicted probability that is said to "offset" the abuse indicator $a_T$ in the target model for the scoring-serving model 220, one or more other offsetting indicators may be used. For example, if an indicator generated from a subset of the engineered features by the scoring-serving model 220 is found to be inversely-correlated to the abuse indicator, the scoring-serving model 220 can be configured to generate the quota score as a function of the abuse indicator and the one or more additional offsetting indicators. In some implementations, the scoring-serving model 220 takes into account one or more offsetting parameters in generating the abuse indicator, i.e., the model target of the model 220 does not always include the offsetting indicators, because the contribution of the indicators are already implicitly represented by the value of the abuse indicator. Each offset indicator i can be tuned by a different parameter $k_i$, further allowing the model 220 to adjust relative contributions of each offset indicator to the abuse score.

The scoring-serving model 220 itself can be implemented according to a variety of different machine learning techniques. For example, the scoring-serving model 220 can be a deep neural network. The model 220 can be trained by the training module 240, as described below, according to any one of a variety of supervised training techniques. Instead of a deep neural network, other example architectures for the scoring-serving model 220 include a random forest model and a decision tree. In some implementations the scoring-serving model 220 is an ensemble of multiple machine learning models, with the same or different architectures and/or model parameter values or hyperparameter values. As a decision tree, the model 220 can be a gradient-boosted decision tree.

Although described as generated using the scoring-serving model 220 implemented as a machine learning model, in some implementations the scoring-serving model 220 generates the various indicators according to any one of a variety of different Bayesian statistical techniques. For example, the scoring-serving model 220 can be configured to generate a plurality of likelihoods that each represent the likelihood that the platform user will abuse additional computing resources within a future time-period, given some condition that can be represented by values for one or more features. The scoring-serving model 220 in these implementations can generate the abuse indicator $a_T$ or any other offsetting indicators as a function of the plurality of likelihoods.

As described earlier with reference to FIG. 1, the quota resolution system 100 can be configured to automatically determine whether the quota for a platform user should be increased, before even receiving a request from the platform user. In some implementations in which the quota resolution system 100 is configured to determine whether to increase quota without a request from the platform user, the quota resolution system 100 can implement the allocation prediction module 270.

The allocation prediction module 270 is configured to predict whether the platform user will require additional computing resources in excess of their quota within a future time-period T. The allocation prediction module 270 can include one or more machine learning models that are trained to receive input representing usage patterns and growth over time in the platform user's usage of currently allocated computing resources. The allocation prediction module 270 can predict whether the platform user will request additional resources within the time-period T. In some implementations, the allocation prediction module 270 can receive raw data from the data orchestration module 205, and process the data into a plurality of features. In addition or alternatively, the allocation prediction module 270 is configured to receive some or all of the engineered set of features from the feature engineering module 215. In some implementations, the allocation prediction module 270 is configured to receive data elsewhere from the platform 110, separate from flow of data as shown in FIG. 110.

The one or more machine learning models of the allocation prediction module 270 can be of a variety of different architectures, trained according to a variety of different supervised learning techniques. For example, if the one or more machine learning models are neural networks, the models can be trained using labeled training data. Each example in the data can include data for usage patterns and growth for computing resource usage by a platform user over a period of time, and be labeled with a time indicating when the platform user made a request for additional resources, as well as the quantity of requested resources. In some implementations, the allocation prediction module 270 can generate a number representing a quantity of computing resources, with a value of 0 interpreted as the module 270 predicting that the platform user will not make a request for additional computing resources within the time-period T. In some implementations, the allocation prediction module 270 predicts separate additional quota usage by type of quota, e.g., project quota or resource quota.

The one or more machine learning models can be trained to predict whether the request time falls within a future time period relative to a set current time, and how much additional resources were requested. A model trainer training the one or more machine learning models can compute the loss between the prediction and the ground-truth, and update weights of the models in accordance with the error, e.g., using backpropagation with gradient descent. A model trainer can be a module of the computing platform 110, e.g., the training module 240, or another module independent but communicatively coupled with the platform 110 and configured to train the one or more machine learning models.

Returning to the scoring-serving model 220, the model 220 can receive the output predicting whether the platform user will send a request for additional computing resources. The model 220 can process this output with the set of engineered features from the feature engineering module 215 to generate the quota score. A example model target function is:

$$g(w_T, q) = Q(w_T, q | I) * I(q_{w_T} > 0)$$

where $w_T$ is a future time-period as a time-window in the range [current time, current time+T] of the current time at which the scoring-serving model 220 generates the output. q is the quota type, e.g., project quota or resource quota. $q_{w_T}$ is the output of the allocation prediction module 270 indicating whether the platform user will require additional resources within the future time-period. I(•) is an indicator function that returns 1 if the input is true, and 0 otherwise. Lastly, $Q(w_T, q|I)$ is a prediction of the amount of computing resources that the platform user will request within the time-window $w_T$.

The training module 240 is configured to train or retrain the scoring-serving model 220. As part of training or retraining the scoring-serving model 220, the training module 240 can receive features generated by the feature engineering module 215 that have been tagged using the data tagging module 210. In general, the data tagging module 210 is configured to periodically, e.g., daily, generate the actual abuse score for a platform user at time k for features taken of the platform user at time k–T (where T is the future time-period during the scoring-serving model 220 is configured to detect abuse).

For example, at day 1 the scoring-serving model 220 receives a request and processes features corresponding to the platform user to generate an abuse score predicting that the platform user will not abuse additionally allocated resources by day 60 (time-period of T). However, between days 2-60 the platform user does abuse the allocated resources. On day 60 the data tagging module 210 tags the set of features processed on day 1 with the correct label, i.e., that the platform user abused the computing resources within the time-period T. As described in more detail, below, the data tagging module 210 can also tag output from the output module 250 which can be processed by the evaluation module 260.

The training module 240 can train and retrain the scoring-serving model 220 using the tagged data from the data tagging module 210. For example, the training module 240 can calculate the error between the predicted output of the scoring-serving model 220 and an expected output defined by the tags of the data tagging module 210 on the processed features of the training examples. Any technique for measuring the error can be used, e.g., Mean Square Error, and the training module can perform a technique such as backpropagation to compute gradients of the loss function with respect to weights of the scoring-serving model 220. Weights for the scoring-serving model 220 can then be updated following gradient calculation, and the process can be repeated, e.g., for a period of time or until arriving at a target accuracy threshold.

The scoring-serving model 220 therefore can adapt to different trends and abuse patterns more readily, which can reduce the staleness of the model 220 and potentially increase accuracy over time. This can be particularly important as platform abusers can change behavior quickly, e.g., within weeks or months. Because the platform 110 can be highly complex and varied in services available to platform users, the training module 240 allows other aspects of the platform 110 to grow unimpeded by consideration for how the platform 110 manages quota resolution.

The training module 240 can retrain the scoring-serving model 220 periodically, e.g., every week or month, or in response to significant changes in model performance. The training module 240 can determine whether there is a significant change in model performance by comparing predicted output from the scoring-serving model 220 with the tagged data, e.g., using mean squared error or some other function. If the difference between the predicted output and the tagged output is large, e.g., exceeding 5% or some predetermined percentage, then the training module 240 can retrain the scoring-serving model 220 for a period of time or until model performance reaches a target threshold.

In some implementations, the training module 240 is configured to periodically retrain the scoring-serving model 220 according to different hyperparameters, e.g., learning rate or mini-batch size. The training module 240 can perform hyperparameter optimization according to a variety of different techniques, e.g., random search. The training module 240 can train the scoring-serving model 220 according to a variety of learning rates, e.g., 0.0001-0.01. In some implementations in which the training module 240 performs backpropagation as part of training the scoring-serving model 220, the corresponding gradients can also be normalized according to different factors, e.g., 0.01-100. The training module 240 can be appropriately configured to train other models implemented by the quota resolution system 100, such as the one or more machine learning models implemented as part of the allocation prediction module 270.

The output module 250 is generally responsible for post-processing, storage, and reporting of the quota score generated by the scoring-serving model 220 as a determination by the platform 110 to increase allocation of computing resources to the platform user. Post-processing can include mapping the raw score from the scoring-serving model 220 onto a different range, which can help in some cases with score interpretation. The output module 250 can apply an order-preserving transformation to calibrate the quota score, e.g., in the range [−1, 1] to a fixed distribution in the range [0,1000]. The mapping from the raw value, e.g., [−1,1] to the fixed distribution [0,1000] can be based on thresholds $(t_0, t_1, \ldots, t_{999})$, where raw score$\leq t_0$ maps to 0; $t_i<$raw score$\leq t_{i+1}$ maps to i, $i \in \{1 \ldots 999\}$; and $t_{999}<$raw score maps to 1000. The set of thresholds can be chosen as q-quantiles of a historical score dataset.

Maintaining the fixed distribution can be valuable in maintaining consistency of the output of the scoring-serving model 220, at least because the engineered set of features from the feature engineering module 215 can vary over time or in response to triggering events, as described above. In this way, even if the model inputs vary, the interpretation of the output score is consistent, and downstream modules of the platform 110, e.g., the output module 250, do not have to be re-calibrated or adjusted.

The output module 250 can generate the approval or rejection of a request from the platform user, using the quota score. Depending on the response, the output module 250 can send a message to the platform user through the user computing device 120, indicating that their request has been approved or denied. In some implementations, the output module 250 can include one or more reasons for allowance or rejection, based on, for example, what the feature engineering module 215 processed as the most important features.

The output module 250 can generate the approval or rejection based on a determination of the quota score meeting a predetermined threshold. The predetermined threshold can represent a minimum score set by the platform 110 for allocating computing resources in excess of a quota assigned to a platform user. The evaluation module 260 on the quota resolution system 100 can generate the threshold based on evaluation of the accuracy of the quota resolution system 100 in resolving quota requests. The threshold can be adjusted to balance accessibility for platform users to have their requests approved, with a certain tolerance for false positives caused by the quota resolution system 100 rejecting platform users that are not actually abusive.

The output module 250 can also adjust the predetermined threshold as a function of other factors. For example, the output module 250 can adjust the threshold based on the number of requests originating from the requesting platform account within a set period of time. The predetermined threshold can also vary according to the type of quota request. For example, the threshold may be higher for a request for additional hardware resources in excess of a quota than for a request for an additional number of projects that a platform user account can author or co-author concurrently on the platform.

The output module 250 can also adjust the predetermined threshold as a function of available computing resources. For example, the output module 250 can set the threshold higher when the overall amount of available computing resources is lower on the platform 110. At a different point in time, the output module 250 can set the threshold lower as computing resources on the platform 110 become more available.

The evaluation module 260 is configured to monitor performance of the scoring-serving model 220 according to a plurality of evaluation criteria. The evaluation module 260 is also configured to trigger a retrain by the training module 240 in response to a determination that model performance is not meeting the plurality of evaluation criteria. The evaluation module 260 can evaluate the output from the output module 250 tagged by the data tagging module 210. The data tagging module 210 can tag output, i.e., the resolution of a quota request given an engineered set of features generated in the past, with the actual result of platform abuse by the platform user. In other words, the system 100, through the data tagging module 210 and the evaluation module 260, can double-check performance of the scoring-serving model 220 against actual results, which in turn can allow the system 100 to improve how quota resolution is performed.

One example of an evaluation criterion is accuracy. The evaluation module 260 can determine whether model performance within a period of time was accurate within a threshold value, e.g., 95% over a period of two months. If model performance does not meet this criterion, then the evaluation module 260 triggers a retrain of the model 220 by the training module 240.

While overall accuracy is an important metric for determining model performance, the evaluation criteria can include related criteria that the evaluation module 260 can use to evaluate different aspects of model performance accuracy, such as a false positive rate. The evaluation module 260 can evaluate the number of false positives by the quota resolution system 100, i.e., the number of times the system 100 denied a platform user's request when they ended up not abusing computing resources. Similarly, the evaluation module 260 can evaluate model performance based on a false negative rate, i.e., the number of platform users that had their quota requests approved but then later abused the additional computing resources.

In some implementations in which the quota resolution system 100 is configured to predict and increase quotas for platform users before receiving a quota request, the evaluation criteria can also include criteria for evaluating use of the additional computing resources by the platform user. The evaluation module 260 can check if the platform user actually used the additional resources. If model performance falls below a threshold value on this criterion, the evaluation module 260 can trigger a retrain by the training module 240. This form of evaluation can help the system 100 to more accurately preempt additional resource needs from non-abusive platform users, which can reduce wasted resources that are otherwise allocated but not used by the platform user.

The evaluation module 260 can evaluate quota scores at different thresholds. Because the output module 250 can map the quota score to a fixed distribution, e.g., [0, 1000], the evaluation module 260 can evaluate quota scores at different cut-off points against the evaluation criteria. In some implementations, the evaluation module 260 sets each value [0,1000] as a threshold, and filters the quota scores generated by the output module 250 according to each threshold. The evaluation module 260 can then evaluate quota scores at each threshold against the evaluation criteria. In this way, the evaluation module 260 can identify with more particularity whether quota scores of different thresholds are falling below expected model performance.

For example, after setting the thresholds for the quota scores and evaluating the quota scores against the plurality of evaluation criteria, the evaluation module 260 can determine that model performance falls below a minimum threshold for quota scores less than 500. In other words, the scoring-serving model 220 may be generating quota scores that more accurately predict whether a platform user is likely to abuse additional computing resources when the resulting score is above 500, but may be less accurate for platform users who are scored at less than 500.

In response, the evaluation module 260 can trigger a retrain by the training module 240. In some implementations, the training module 240 can tailor input training data to more broadly cover a particular threshold of scores. For example, the training module 240 can receive more training examples tagged with quota scores below 500, to focus model improvement. In some implementations, the evaluation module 260 identifies common values for some features shared between platform users scored at a particular threshold in which reduced model performance is identified. The training module 240 in response can receive more training examples having those common feature values.

Figure 4:
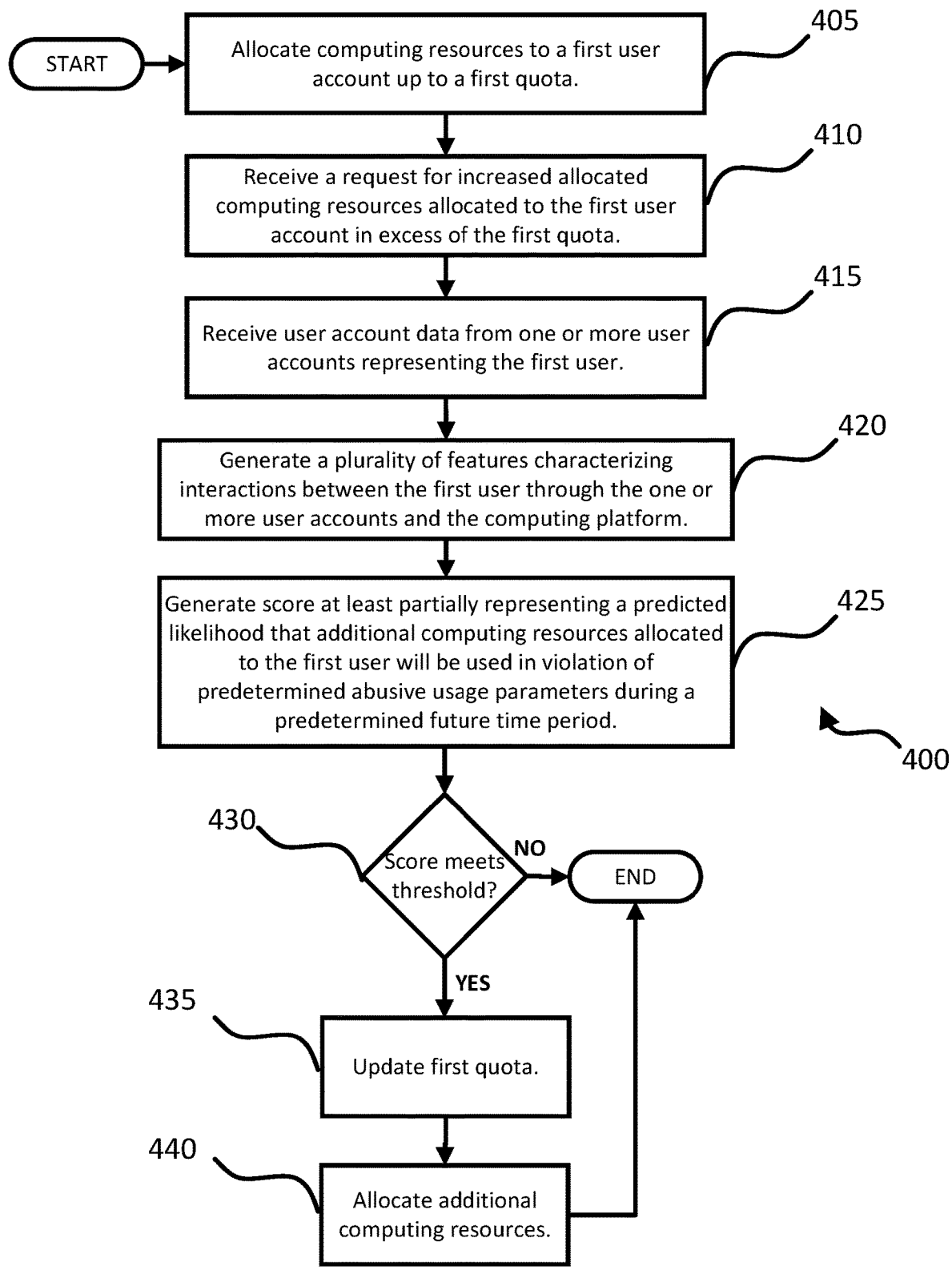
FIG. 4 is a flowchart showing an example process for resolving a quota request using a quota resolution system.

FIG. 4 is a flow chart showing an example process 400 for resolving a quota request using a quota resolution system. The process 400 is described as being performed by a cloud computing platform having one or more server computing devices and one or more user computing devices, located in one or more physical locations and programmed in accordance with aspects of this disclosure. For example, the cloud computing platform 110 implementing the quota resolution system 100, appropriately programmed, can perform the process 400. Steps of the process 400 can be performed in different orders, with additional steps added or some steps as shown in the process 400 removed.

The computing platform allocates 405 computing resources up to a first quota to a first user account representing a first user. As described above with reference to FIG. 1, the platform can do this as part of account creation. The first user account can be a platform account. In some implementations the quota resolution system 100 handles initial allocation or additional allocation, while in other implementations the quota resolution system is configured to cause one or more other modules to allocate computing resources.

The system receives a request for increased allocated computing resources for the first user account in excess of the first quota, according to block 410. In some implementations and as described below with reference to FIG. 5, the platform does not receive the request, but instead automatically determines whether the first quota should be updated and additional computing resources allocated.

The platform receives user account data from one or more user accounts representing the first user, according to block 415. Referring to FIG. 2, the platform can receive the user account data from different parts of the platform and using the data orchestration module 205 of the quota resolution system 100. The user account data can be processed so that it can be consumed by modules downstream of the data orchestration module 205, e.g., the feature engineering module 215.

The platform generates a plurality of features at least partially from the user account data characterizing interactions between the first user and the computing platform, according to block 420. The interactions refer to user activity across the platform and using the one or more user accounts representing the platform, e.g., platform, virtual machine, project, application, and billing accounts. As described above with reference to FIG. 2, the feature engineering module 215 is configured to generate features either directly or indirectly from data obtained from the data orchestration module 210. The data obtained can include the user account data.

The platform generates a score at least partially representing a predicted likelihood that additional computing resources allocated to the first user will be used in violation of predetermined abusive usage parameters during a predetermined future time period, according to block 425. For example, the scoring-serving model 220 as described above with reference to FIG. 2 can be trained to generate the score from the engineered set of features of the feature engineering module 215.

The platform determines whether the score meets a threshold, according to diamond 430. If not ("NO"), the process ends, and the platform can report to the first user, e.g., through a user computing device, that the quota request from the first user is denied. As described above with reference to FIG. 2, the output module 250 can compare the quota score against a threshold to determine how the quota request should be resolved. The threshold can be a composite of a variety of different criteria, or in some implementations can be a predetermined score threshold, e.g., 700. Meeting the threshold can be indicative of a minimum trustworthiness by the platform of the platform user, based on the generated score.

If the platform determines 430 that the score meets the threshold, then the quota resolution system can cause the computing platform to update 435 the first quota. The quota resolution system itself can update the first quota, or the system can cause another component of the platform to update the first quota. The amount increased by the quota can be a function of the request itself, or can be based on an increased amount indicated in the request. The platform can then allocate 440 additional resources in response to the request.

Figure 5:
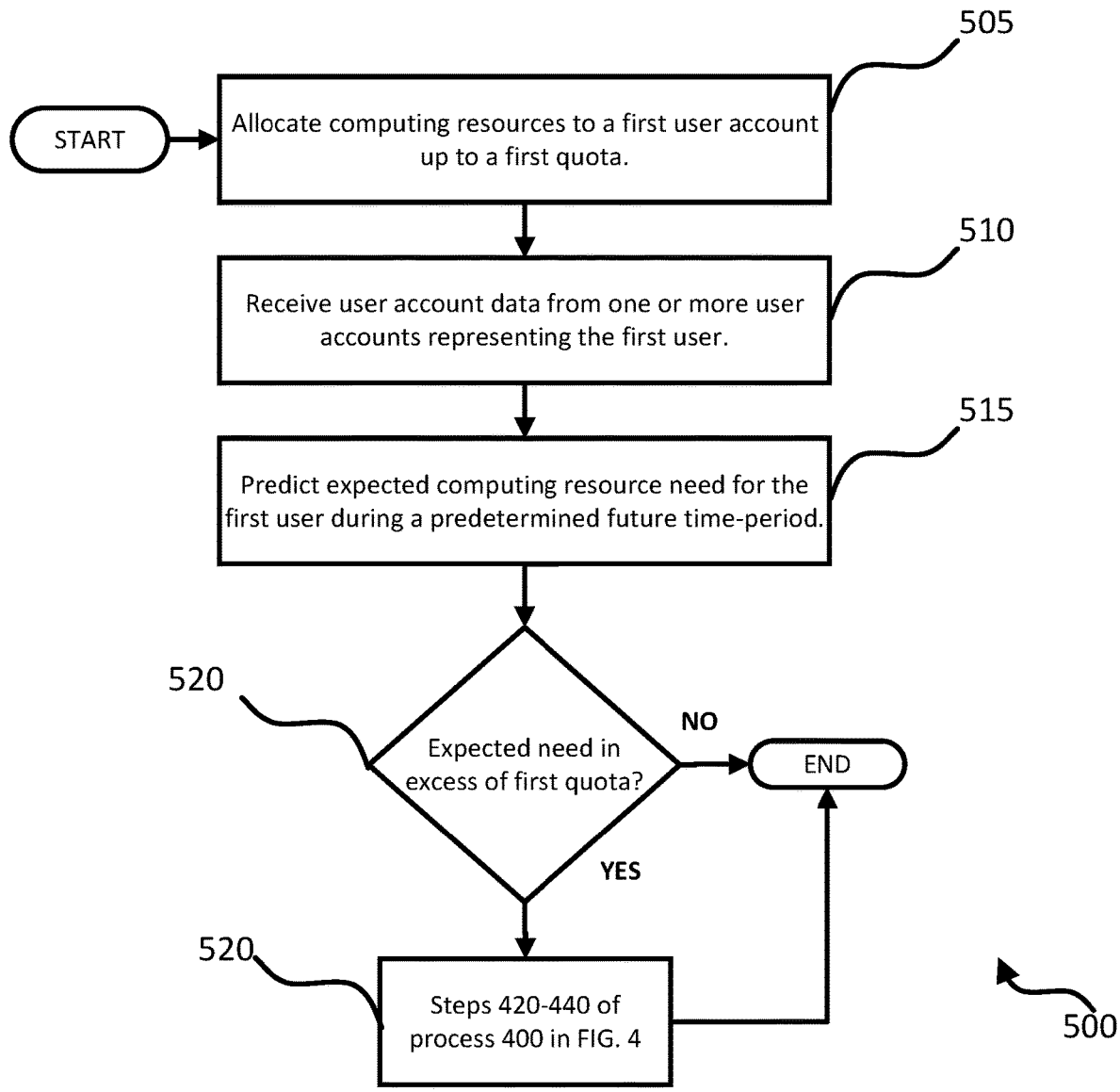
FIG. 5 is a flowchart showing an example process for allocating additional computing resources before receiving a quota request from a first user.

FIG. 5 is a flow chart showing an example process 500 for allocating additional computing resources before receiving a quota request from a platform user. The process 500 is described as being performed by a cloud computing platform having one or more server computing devices and one or more user computing devices, located in one or more physical locations and programmed in accordance with aspects of this disclosure. For example, the cloud computing platform 110 implementing the quota resolution system 100, appropriately programmed, can perform the process 500. Steps of the process 500 can be performed in different orders, with additional steps added or some steps as shown in the process 500 removed.

The platform allocates computing resources to a first user account up to a first quota, according to block 505. The platform receives user account data from one or more user accounts representing the first user, according to block 510. The first user account can be the platform account of the first user.

The platform predicts computing resource needs for the first user during a predetermined future time period, according to block 515. As described above with reference to FIG. 2, the quota resolution system 100 can include an allocation prediction module 270 that is configured to predict increase in computing resource needs for a platform user within a future time-period.

The platform determines whether the predicted expected need is in excess of the first quota, according to diamond 520. If not ("NO"), the platform ends the process 500. If the platform determines that the expected need is in excess of the first quota ("YES"), then the platform can continue as in the process 400 from, i.e., generating a plurality of features characterizing interactions between the first user and the platform; determining whether the score meets a threshold; and updating the first quota; and allocating additional computing resources for the first user, according to blocks 420-440.

Aspects of the disclosure can be implemented so as to realize one or more of the following advantages. Quota request resolution can be performed more accurately and in an automated fashion. A quota resolution system implemented consistent with aspects of this disclosure can generate likelihood of future abuse by a user of a cloud computing platform, even if the platform user is represented by user accounts with little characterizing data and no past history of abuse. By more accurately resolving quota requests in favor of platform users that are less likely to abuse additional computing resources, the platform can mitigate the risk of stockout—the situation in which all available computing resources on the platform are exhausted and the platform does not have sufficient available resources to resolve future quota requests.

The system can accurately predict that a reformed platform user will not abuse additional computing resources in spite of some past history of abuse. The quota resolution system can leverage diverse and feature-rich signals unique to a cloud computing platform, which can make better use of available data than previous rule-based approaches relying on a small set of hand-tuned parameters. More accurate quota request resolution can improve overall resource usage of the platform, because allocated computing resources are more likely to be used in a manner consistent with not violating abusive usage parameters of the platform.

Computing resources can also be allocated more judiciously to prevent computing resources from being allocated but going unused. Quotas for different users can be increased based on predictions of a user's need for additional resources automatically and with more confidence, by proactively allocating additional computing resources only to non-abusive users. Improved automation of a quota request resolution process can also reduce the number of requests to the platform and turnaround time between the time a user sends a request, and the time the quota resolution system resolves the request. A reduced turnaround time without sacrificing accuracy can improve the user experience in interacting with the platform, at least because any delay caused by waiting for an increased quota of resources is reduced, allowing continued and increased productivity. The system can also reduce the number of interactions between the platform and the requesting user, at least because the system can operate on available data of the platform 110 and is less likely to subsequently request additional information from the user.

Based on predictions by the system, prospective and existing users of the computing platform can be targeted for preemptive offers and advertisements for computing resource quota increases. For example, new users to the platform can be offered varying amounts of quota during on-boarding based on system predictions, so that users may quickly begin to use the platform without prematurely running into resource allocation issues. Instead, the platform can analyze signals for the platform user across multiple sources as described herein, to predict users with a low risk of abusing additionally allocated resources even before the user's initial quota request.

Aspects of this disclosure can be implemented in digital circuits, computer-readable storage media, as one or more computer programs, or a combination of one or more of the foregoing. The computer-readable storage media can be non-transitory, e.g., as one or more instructions executable by a cloud computing platform and stored on a tangible storage device.

A computer program can be written in any type of programming language, and according to any programming paradigm, e.g., declarative, procedural, assembly, object-oriented, data-oriented, functional, or imperative. A computer program can be written to perform one or more different functions and to operate within a computing environment, e.g., on a physical device, virtual machine, or across multiple devices. A computer program can also implement functionality described in this specification as performed by a system, engine, module, or model.

In this specification the phrase "configured to" is used in different contexts related to computer systems, hardware, or part of a computer program, module, or engine. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program, module, or engine, is said to be configured to perform one or more operations, this means that the computer program includes one or more program instructions, that when executed by one or more computers, causes the one or more computers to perform the one or more operations.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system comprising:
a computing platform comprising a plurality of processors and one or more storage devices storing instructions that are operable, when executed by the plurality of processors, to cause the plurality of processors to perform operations comprising:
allocating computing resources up to a first quota and to a first user account of one or more user accounts representing a first user of the computing platform, wherein the first quota is an upper limit of computing resources allocated to the first user account;
receiving user account data from the one or more user accounts representing the first user;
generating a plurality of features from the user account data, wherein each feature is a measurable characterization of interactions between the one or more user accounts and the computing platform;
generating, from at least the plurality of features, a score at least partially representing a predicted likelihood that additional computing resources allocated to the first user account will be used in violation of one or more predetermined abusive usage parameters during a predetermined future time period, wherein generating the score comprises generating the score using one or more machine learning models trained to generate the score from the plurality of features;
determining, by the system, that the score does not meet a plurality of evaluation criteria; and
in response to determining that the score does not meet the plurality of evaluation criteria, retraining the one or more machine learning models trained to generate the score from the plurality of features.

2. The system of claim 1, wherein generating the score comprises:
generating a higher score in response to a lower predicted likelihood that the additional computing resources will be used in violation of the predetermined abusive usage parameters; and
generating a lower score in response to a higher predicted likelihood that the additional computing resources will be used in violation of the predetermined abusive usage parameters.

3. The system of claim 2, wherein the operations further comprise:
determining that the generated score does meet a predetermined threshold representing a minimum score for allocating additional computing resources in excess of a respective quota for a user account; and
in response to determining that the generated score meets the predetermined threshold, allocating additional computing resources to the first user account, and updating the first quota.

4. The system of claim 3, wherein allocating the additional computing resources to the first user comprises:
predicting a first time by which the first user will require the additional computing usage, and
allocating the additional computing resources before the first time.

5. The system of claim 1,
wherein the user account data is first user account data received at a first time, and the generated score is a first score, wherein the operations further comprise:
generating tagged user account data, including:
receiving second user account data generated at a second time prior to the first time and separated by a length of time equal to or greater than the length of the predetermined future time period, and
tagging the second user account data with a second score generated using the second account data after the expiration of the future time period relative to the second time; and
retraining the one or more machine learning models on the tagged user account data.

6. The system of claim 1, wherein generating the plurality of features comprises:
generating a graph representing the one or more user accounts; and
generating a first feature of the plurality of features from one or more other features of the plurality of features of the one or more user accounts in the graph.

7. The system of claim 1,
wherein the user account data comprises data characterizing computing resource usage by the first user through the one or more user accounts on the computing platform, and
wherein the operations further comprise determining that the first user requires additional computing resources, comprising processing the data characterizing computing resource usage by the first user through one or more machine learning models trained to receive the data characterizing computing resource usage and to predict a measure of additional computing resources needed in excess of the first quota during the predetermined future time period.

8. The system of claim 7, wherein the operations further comprise determining a quantified measurement of additional computing resources to allocate to the first user, in accordance with the data characterizing computing resource usage.

9. The system of claim 1,
wherein the predicted likelihood is a predicted abuse likelihood,
wherein the operations further comprise maintaining a resource allocation service for allocating additional computing resources of the computing platform in response to a user request and a payment; and
wherein generating the score comprises:
generating a predicted revenue likelihood that the computing platform will receive a first request to allocate additional computing resources and a first payment from one of the one or more user accounts within the predetermined future time period, and
generating the score as a function comprising the predicted revenue likelihood and the predicted abuse likelihood.

10. The system of claim 9,
wherein generating the score further comprises generating the score in accordance with:

$$f(x_T, a_T) = act(x_T) + a_T * (act(x_T) - 1)$$

where T is the predetermined future time period, $x_T$ is the predicted revenue likelihood, $a_T$ is the predicted abuse likelihood, and act(•) is a nonlinear function with a range between −1 and 1.

11. The system of claim 10, wherein the nonlinear function is one of a logistic function, a hyperbolic tangent function, and a rectified linear unit function.

12. The system of claim 1, wherein generating the predicted likelihood comprises generating the predicted likelihood in response to a request from the first user account for the additional computing resources.

13. The system of claim 1,
wherein the operations further comprise executing, by the computing platform, a plurality of applications hosted on one or more of the plurality of computers, and
wherein the one or more user accounts comprises one or more of:
an application account comprising data corresponding to the first user for interacting with one or more of the plurality of applications, and
a billing account comprising data corresponding to billing activity between the first user and one or more of the plurality of applications.

14. The system of claim 1,
wherein the computing resources allocated to the first user comprises computing resources configured to execute one or more virtual machines, and
wherein the one or more user accounts includes a virtual machine entity comprising data corresponding to virtual machine creation and usage by the first user on the computing platform.

15. The system of claim 1,
wherein the operations further comprise hosting, by the computing platform, one or more software projects hosted on the computing platform, and
wherein the one or more user accounts includes a project entity comprising data corresponding to one or more projects authored or co-authored by the first user.

16. The system of claim 1, wherein the first quota represents one or both of:
an upper limit of computing resources to be allocated to the first user, and
an upper limit of the number of concurrent projects hosted on the computing platform and authored or co-authored by the first user.

17. The system of claim 1, wherein the operations further comprise sending an indication that the additional computing resources have been allocated to the first user, to a first user device associated with the first user.

18. A computer-implemented method performed by a computing platform, comprising:
allocating computing resources up to a first quota and to a first user account of one or more user accounts representing a first user of the computing platform, wherein the first quota is an upper limit of computing resources allocated to the first user account;
receiving user account data from the one or more user accounts representing the first user;
generating a plurality of features from the user account data, wherein each feature is a measurable characterization of interactions between the one or more user accounts and the computing platform; and
generating, from at least the plurality of features, a score at least partially representing a predicted likelihood that additional computing resources allocated to the first user account will be used in violation of one or more predetermined abusive usage parameters during a predetermined future time period, wherein generating the score comprises generating the score using one or more machine learning models trained to generate the score from the plurality of features;
determining that the score does not meet a plurality of evaluation criteria; and in response to determining that the score does not meet the plurality of evaluation criteria, retraining the one or more machine learning models trained to generate the score from the plurality of features.

19. One or more non-transitory computer-readable storage media storing instructions that are operable, when performed by a computing platform comprising one or more processors, causes the one or more processors to perform the operations comprising:

allocating computing resources up to a first quota and to a first user account of one or more user accounts representing a first user of the computing platform, wherein the first quota is an upper limit of computing resources allocated to the first user account;

receiving user account data from the one or more user accounts representing the first user;

generating a plurality of features from the user account data, wherein each feature is a measurable characterization of interactions between the one or more user accounts and the computing platform; and generating, from at least the plurality of features, a score at least partially representing a predicted likelihood that additional computing resources allocated to the first user account will be used in violation of one or more predetermined abusive usage parameters during a predetermined future time period, wherein generating the score comprises generating the score using one or more machine learning models trained to generate the score from the plurality of features;

determining that the score does not meet a plurality of evaluation criteria; and in response to determining that the score does not meet the plurality of evaluation criteria, retraining the one or more machine learning models trained to generate the score from the plurality of features.

* * * * *